Patented Jan. 17, 1939

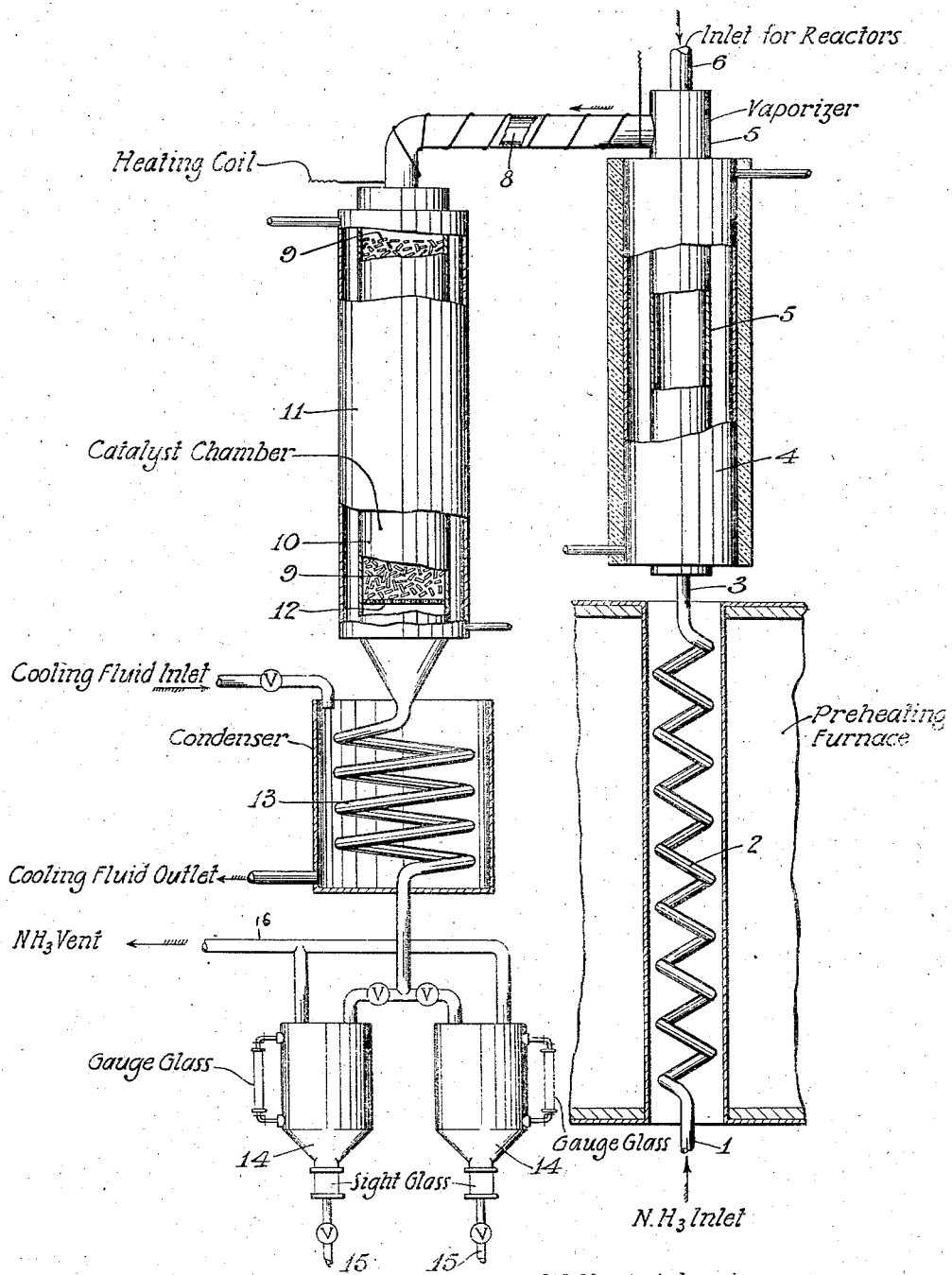

2,144,340

UNITED STATES PATENT OFFICE 2,144,340

PROCESS AND APPARATUS FOR THE PRODUCTION OF ADIPONITRILE

Wilbur A. Lazier, New Castle County, Del., assignor to E. I. du Pont de Nemours & Company, Wilmington, Del., a corporation of Delaware Application March 26, 1937, Serial No. 133,275

14 Claims. (Cl. 260—464)

This invention relates to a catalytic process for the preparation of adiponitrile, and more particularly to a process whereby vapor mixtures of ammonia and adipic acid are brought into contact with dehydrating catalysts to produce adiponitrile and water in high yields. This is a continuation-in-part of my copending application, Serial No. 75,549, filed April 28, 1936.

Methods for the transformation of naturally occurring fatty acids into useful products such as salts, amides, esters, anhydrides, acid chlorides, ketones, alcohols, nitriles, and amines, have long been known in the literature. In many cases, it has been a relatively simple matter to develop laboratory procedures into practicable large-scale manufacturing processes. This has led to a widespread commercial exploitation of various derivatives of the more abundant fatty acids.

More recently, synthetic methods have been developed for the manufacture of certain dicarboxylic acids whose derivatives are likewise of potential technical importance. For the most part, however, functional derivatives of dicarboxylic acids have not become common articles of commerce owing to difficulties encountered in developing suitable large-scale manufacturing processes. Adipic acid is one of the important commercially available dicarboxylic acids falling within this category, and among its less familiar derivatives, adiponitrile or tetramethylene dicyanide is of especial interest.

Adiponitrile has been known in the literature since 1902 when it was prepared by Henry (Bull. Acad. Roy. Belg., 7, 367 (1902)) by the interaction of tetramethylene dibromide and alkali metal cyanides. In 1909 Thorpe (J. C. S., 95, 1902 (1909)) duplicated Henry's procedure using tetramethylene iodide. Unfortunately, the processes of Henry and Thorpe have been of little commercial value, since they require the use of intermediates that are both costly and difficult to prepare, whereas adipic acid is now a commercially available raw material. There are, of course, well-known methods for converting acids to the corresponding nitriles. One method comprises treating an acid amide with a chemical dehydrating agent such as phosphorus pentachloride. Alternatively, phosphorus pentoxide, thionyl chloride, phosgene, and the like may be employed to dehydrate amides. Adiponitrile can be prepared in low yields by these methods but the processes are uneconomical for manufacture on a commercial scale. These processes are tedious to carry out and involve the use of expensive chemical dehydrating agents. To the best of my knowledge there has been no disclosure of a practical continuous vapor phase catalytic process for the manufacture of adiponitrile from adipic acid prior to my discovery of the processes of this invention.

Adipic acid has many properties that serve to distinguish it from the higher mono- and dicarboxylic acids. For example, stearic, palmitic, oleic, and sebacic acids, etc., will withstand moderately high temperatures without difficulty, but under the same conditions adipic acid undergoes decomposition reactions with the formation of carbon, tar, volatile products, and gases. These reactions occur even more readily and at lower temperatures in the presence of small amounts of catalytic materials such as iron oxide, aluminum oxide, manganese oxide, and the like. The structure of adipic acid is particularly conducive to the elimination of carbon dioxide to form cyclopentanone. This product, in common with many other ketones, will readily undergo condensation reactions to produce the dimer, trimer, and non-volatile high molecular weight polymeric materials. On prolonged heating, cyclopentanone resins are decomposed to hard, refractory carbonaceous products. All of these effects are accentuated by heating in the presence of most of the common dehydrating catalysts. It has also been observed that adipic acid decomposes quite readily in the presence of ammonia at temperatures above 180–200° C. In view of these observations, my discovery that adipic acid can be converted smoothly to adiponitrile by a high temperature vapor phase process comprises an unexpected result and a valuable contribution to the art.

An object of this invention is to prepare adiponitrile. A further object is to provide a vapor phase catalytic process for the preparation of adiponitrile from adipic acid and ammonia. A still further object is to provide an efficient catalytic vapor phase process for the conversion of adipic acid to adiponitrile that is capable of operation on a commercial scale. Another object is the development of an apparatus for the production of adiponitrile. Still another object is the development of an apparatus which will withstand the corrosive tendency of the reaction without being detrimental to the reaction. And still another object is the development of an inner surface in the apparatus which will aid in the protection against corrosion and against adverse catalytic effect of the substance composing the inner wall of the apparatus. Other objects will appear hereinafter.

These objects are accomplished by the following invention which comprises bringing adipic acid or an adipic acid derivative admixed with an excess of ammonia into contact with an efficient dehydrating catalyst at elevated temperatures, said adipic acid derivative being one capable of dehydration to a nitrile or which when combined with ammonia becomes capable of dehydration to a nitrile. A flow sheet of the process in suitable diagrammatic form is shown in the appended drawing. Referring to the drawing, my process is operated continuously in the following manner: A stream of ammonia is passed at a measured rate into the apparatus at 1 and thence through preheating coil 2, which is operated at approximately 500° C., into the bottom 3 of the vaporizing chamber 5. The vaporizing chamber is maintained at approximately 325–350° C. by means of an electric furnace or vapor heating bath 4. Adipic acid, either in powder form or preferably molten, is introduced simultaneously into the vaporizing chamber at 6 and is evaporated in contact with the counter-current stream of ammonia. The mixture of adipic acid vapor and ammonia produced is swept over into the separate catalyst chamber 10 through a heated transfer line 8. The catalyst chamber is likewise maintained at a temperature between 325° and 350° C. in a heating bath 11. The vapor mixture of adipic acid and ammonia is converted to a mixture of adiponitrile, water, and by-products in passing through the bed of dehydrating catalyst 9. These reaction products pass through the perforated plate 12 and from thence pass into the cooling coil 13 where liquid products are condensed. The liquid products are collected in the separators 14. The oil layer is drained periodically via pipe 15 and refined by distillation to give pure adiponitrile. The aqueous layers are extracted to recover dissolved nitrile and discarded. Ammonia and other gases are vented from the separators at 16. After suitable purification, excess ammonia may be returned to the process. According to the preferred embodiments of the invention, adiponitrile is produced in high yields as illustrated in the following examples:

Example I

A stream of ammonia is passed at the rate of 0.087 cu. ft. per minute over 477 cc. of silica gel catalyst that is maintained at a temperature between 325° and 340° C. Six hundred seventeen grams of adipic acid vapor is passed with the ammonia at a uniform rate during a period of 11.5 hours. Under these conditions, the molecular ratio of ammonia to adipic acid is 16 to 1, the space velocity is about 325, and the contact time 5 seconds. In traversing the catalyst, the vapor mixture is dehydrated mainly to adiponitrile and water. The product is condensed and separates into two immiscible layers of approximately equal volume. The upper layer consists of a dark red oil that weighs 424 grams, and on fractional distillation it yields 337.5 grams of adiponitrile, B. P. 147–148° C./10 mm., 36.2 grams of cyclopentanone, B. P. 128–130° C., and 20.5 grams of tarry residue, together with small amounts of water and ammonia. The molecular conversions to nitrile and ketone are 74% and 10.2%, respectively. An additional 3% of adiponitrile is obtained by extracting the aqueous layer with benzene.

Example II

Pure adipamide is vaporized at the rate of 120 grams per hour in a stream of hot ammonia gas, which is passed at the rate of about 112 grams per hour. The vapor mixture is brought into contact with 507 cc. of silica gel catalyst, which is maintained at a temperature of 325–345° C. The ammonia ratio is 8 to 1, the space velocity 325, and the contact time 5 seconds. From 1100 grams of adipamide, there is obtained 745.4 grams of crude oily product that on distillation gives 70 grams of cyclopentanone, 608 grams of adiponitrile, and 41.2 grams of tarry residue. These values correspond to molecular conversions of 10.9%, 74%, and 5%, respectively.

Example III

Twenty-two hundred seventy-five grams of adipic acid is vaporized at the rate of 3 grams per minute and conducted in admixture with hot ammonia gas over 507 cc. of silica gel catalyst heated to 345° C. The molecular ratio of ammonia to acid is maintained at 8 to 1 so that the space velocity is 490 and the contact time is 3.2 seconds. After separating the water, the oily product is worked up according to the procedure of Example I to give 120.5 grams of cyclopentanone, 1181 grams of pure adiponitrile, and 99.2 grams of residue.

Example IV

A stream of molten adipic acid is introduced into a vaporizing chamber, heated to 350° C., at the rate of about 4 pounds per hour. There is produced continuously a vapor mixture, containing approximately 8 molecules of ammonia for each molecule of adipic acid, which is passed over 9.5 liters of silica gel catalyst contained in a separate reaction vessel heated to 345° C. The vaporized ammonium adipate is converted mainly to adiponitrile and water. These products are condensed, the water layer separated, and the oil fractionally distilled under reduced pressure. In processing 233 pounds of adipic acid over a period of 56.5 hours, there is obtained 167.7 pounds of crude oil that yields 4.6 pounds of cyclopentanone, 121 pounds of adiponitrile, and 14.9 pounds of non-distillable residue. The average conversion to adiponitrile is 70.5% of theory.

Although in the foregoing examples I have indicated the use of certain definite conditions of temperature, ammonia concentration, space velocity, contact time, catalyst volumes, etc., it is to be understood that these values may be varied somewhat within the scope of the invention without affecting the utility thereof.

The processes of my invention are operated to produce high yields of adiponitrile at catalyst temperatures within the relatively restricted range from 320° to 400° C. At lower temperatures, conversion is incomplete and intermediate products such as ammonium adipate, adipamide, adipimide, ammonium cyanovalerate and cyanovaleramide are formed. Many of these intermediate products are vaporized with difficulty at temperatures below 320° C., even in the presence of an excess of ammonia, and are deposited on the catalyst where cracking and decomposition reactions produce carbon, tar, hydrocarbons, and hydrocyanic acid. The catalyst chamber becomes choked with carbon quickly, and the product obtained is practically worthless for most purposes. At temperatures above 400° C. the thermal decomposition of adipic acid to form cyclopentanone becomes quite serious and is accompanied by a sharp decline in the adiponitrile yield. Moreover, these conditions favor the self condensation of cyclopentanone to form non-volatile resins that decompose on the catalyst bed and soon plug it completely. Adiponitrile likewise becomes very reactive and undergoes the well-known Thorpe reaction to form either polymers or an isomeric compound, 1-imino-2-cyanocyclopentane. The crude product is found to contain large amounts of by-products that are, in many cases, impossible to remove by physical methods of purification. In the preferred temperature range, undesirable side reactions are kept to a minimum, and the process may be operated continuously throughout the useful life of the catalyst.

The choice of a suitable temperature is not the only important consideration in connection with the operation of my process for preparing adiponitrile. As a matter of fact, all of the operating variables are interdependent to such an extent that deviation of any one of them from the operable range is likely to cause serious trouble or even failure. In the above examples, I have mentioned three important and closely related variables: ammonia ratio, space velocity, and time of contact. The ammonia ratio is an expression of the relative concentrations of ammonia and adipic acid in the reaction vessel at any instant. The space velocity is a measure of the rate at which the gaseous reactants pass through the catalysts and is defined as the number of volumes of gas, calculated at standard conditions, that traverse one volume of catalyst during one hour. The term "time of contact" is defined as the time in seconds required for the gaseous reactants to traverse the entire volume of the catalyst at the temperature and pressure of the reaction, assuming that no change in volume occurs. The contact time in seconds is calculated from the space velocity by the following expression:

Time of contact in seconds=

$$\frac{273 \times 60 \times 60}{(273+\text{temp. in °C.}) \times \text{space velocity}}$$

In the practice of my invention, ammonia-acid molecular ratios of at least 4:1 must be employed in order to avoid complicating side reactions, and in general it becomes uneconomical to operate with ammonia ratios higher than 24:1. Preferably ammonia ratios in the range from 6:1 to 16:1 are employed. The contact time may be varied from 1 to about 10 seconds, but superior results are obtained using a contact time of about 5 seconds.

The dehydrating catalysts of this invention are selected from among the oxides and salts of elements of the 3d, 4th, 5th, 6th, and 8th groups of the Periodic Table. Among these might be mentioned the dehydrating oxides of aluminum, silicon, tungsten, titanium, molybdenum, and the like. They are preferably employed in the form of hard, porous, non-crystalline gels that are unaffected by high temperatures and continuous contact with the reaction vapors. A catalyst may be used either in the pure state or admixed with other catalysts and promoters. Acidic catalysts such as phosphoric, phosphotungstic, and phosphomolybdic acids or their anhydrides supported on suitable porous materials such as silica gel, pumice, and kieselguhr, may also be employed. Within the group of operable catalytic materials there are marked variations in efficiency. Theoria, alumina, and iron oxide, for example, tend to promote side reactions as well as the formation of nitrile. The preferred catalyst is a highly purified synthetic silica gel such as may be prepared by neutralizing sodium silicate or by hydrolyzing silicon halides and ortho-silicic acid esters. Spent catalysts may be restored to their original activity by oxidation of carbonaceous deposits in a stream of oxygen-containing gas at elevated temperatures.

Owing to the sensitivity of the adipic acid-ammonia reaction system to high temperatures, it is seldom possible to prevent the formation of small amounts of carbonaceous materials in carrying out the process of this invention. The design and construction of equipment is, therefore, exceedingly important. Apparatus of the type described in the appended drawing is suitable. Separate vaporization of adipic acid is especially desirable. If, for example, the operation is carried out in a single vertically mounted tube containing a vaporizing section and catalyst bed, the reaction will soon be terminated by cementation of the catalyst with non-volatile tarry materials that are formed in relatively small amounts. By using a separate vaporizing chamber, these materials are retained therein. Moreover, commercial adipic acid may contain metallic impurities, such as iron, manganese and aluminum oxides, that promote side reactions. Contamination of the catalyst with impurities soon leads to permanent catalyst deterioration. This is likewise avoided by using a separate vaporizer.

I have found that certain metals suffer excessive corrosion in contact with vapor mixtures of adipic acid and ammonia; others exert an adverse catalytic effect on the reaction, while still others show very little of either effect. This is of no consequence in conducting the reaction on a laboratory scale where glass apparatus can be used. However, on a commercial scale, it is impracticable to use ceramic materials, and suitable metallic materials of construction must be employed. Iron, mild steel, ordinary stainless steel, and copper are in general unsatisfactory. I have found, for example, that a clean iron surface will depress the adiponitrile yield by 25–30%, with a corresponding increase in the amount of cyclopentanone derivatives which are being formed. Pure nickel, aluminum and aluminum alloys, stainless steel containing molybdenum, and copper-silicon-manganese alloys (for example, such as are commercially available under the trade name "Everdur") are to be preferred. Even the best metallic materials of construction require seasoning in contact with the reaction vapors. For instance, I have observed that after operating freshly cleaned aluminum equipment for several hours, the yield of adiponitrile is increased by as much as 8–10% over the yield initially obtained. A thin layer of carbonaceous material deposited on the metallic surface may be used to protect it against corrosion and minimize any adverse wall effect on the process.

The processes of this invention are preferably carried out using adipic acid and ammonia as the raw materials. Nevertheless, certain derivatives of adipic acid may also be treated to give the same results. Among these might be mentioned adipamide, adipimide, esters of adipic acid, omega-cyanovaleric acid, adipamic acid, and omega-cyanovaleramide. Depending on their physical properties, these materials may be introduced into the reaction chamber either as powdered solids, liquids, gases, or in solution or suspension in suitable solvents. Liquids are conveniently sprayed into a vaporizing chamber.

Generally speaking, it is preferable to operate at ordinary pressures, but if so desired super- or subatmospheric pressures may be utilized.

It is readily apparent that my invention offers many advantages over the tedious and expensive methods for preparing adiponitrile that have been disclosed in the prior art. It comprises a simple, direct and continuous catalytic process whereby high yields of adiponitrile are produced from relatively inexpensive raw materials. The process is adaptable to operation on any desired scale. Heretofore, adiponitrile has been known only as a costly laboratory chemical. The discovery of an economical process for its manufacture has opened up a wide field of potential uses. It is potentially valuable as an intermediate for the manufacture of resins, rubber chemicals, amines (according to the process of copending application No. 49,973), plastics, gelling agents for wax emulsions, insecticides, and the like.

Now having described the preferred embodiments of my invention, it is to be understood that I do not limit myself to the specific embodiments thereof except as defined in the following appended claims.

I claim:

1. A process for the preparation of adiponitrile which comprises passing a gaseous mixture comprising ammonia and a compound selected from the group consisting of adipic acid adipamide, adipimide, an ester of adipic acid, omega-cyanovaleric acid, adipamic acid, and omega-cyanovaleramide over a dehydration catalyst at a temperature between 320° and 400° C. and at such a rate that the time of contact of the reactants with the catalyst is maintained between about one second and about ten seconds, said reaction being further characterized in that the ammonia present in the gaseous mixture to be passed over the catalyst is in an amount which is in excess of the molecular equivalent of the compound selected from the group enumerated above.

2. The process in accordance with claim 1 characterized in that the ammonia is present in an amount of at least four times the molecular equivalent of the other reactants.

3. The process in accordance with claim 1 characterized in that ammonia is present in amounts between six to sixteen times the molecular equivalent of the other reactants and the time of contact of the reactants with the catalyst is about five seconds.

4. The process in accordance with claim 1 characterized in that the catalyst is silica gel.

5. The process in accordance with claim 1 characterized in that the dehydration catalyst comprises as an essential catalytic component a heteropoly acid.

6. The process in accordance with claim 1 characterized in that the gaseous mixture comprises ammonia and adipic acid.

7. A process for the preparation of adiponitrile which comprises bringing a gaseous mixture comprising ammonia and adipic acid, said mixture containing at least four times as much ammonia by mols as adipic acid, in contact with a dehydration catalyst comprising as an essential component silica gel, at a temperature between 320° and 400° C. for a period of time between about one second and about ten seconds.

8. The process in accordance with claim 7 characterized in that the time of contact with the catalyst is about five seconds.

9. The process in accordance with claim 7 characterized in that the reaction is carried out at a temperature of about 345° C.

10. The process in accordance with claim 7 characterized in that the molecular ratio of ammonia to adipic acid is between six and sixteen.

11. A process for the preparation of adiponitrile which comprises passing a gaseous mixture comprising ammonia and adipic acid, the molecular ratio of ammonia to adipic acid in said mixture being between six and sixteen, over a dehydration catalyst comprising as an essential component silica gel, at a temperature of about 345° C. and at such a rate that the time of contact of the reactants with the catalyst is about five seconds.

12. A process for the preparation of adiponitrile which comprises bringing a gaseous mixture comprising a molecular excess of ammonia and a member of the group consisting of adipic acid, adipamide, adipimide, an ester of adipic acid, omega-cyanovaleric acid, adipamic acid, and omega-cyanovaleramide at a temperature between 320° and 400° C., in contact with a dehydration catalyst in a reaction chamber for a period of time between about one second and about ten seconds, said reaction chamber being constructed of a catalytically inactive, corrosion-resistant material.

13. A process for the preparation of adiponitrile which comprises bringing a gaseous mixture comprising a molecular excess of ammonia and a member of the group consisting of adipic acid, adipamide, adipimide, an ester of adipic acid, omega-cyanovaleric acid, adipamic acid, and omega-cyanovaleramide, at a temperature between 320° and 400° C., in contact with a dehydration catalyst in a reaction chamber for a period of time between about one second and about ten seconds, said reaction chamber having a metallic inner surface upon which is deposited a thin layer of carbonaceous material.

14. A process for the preparation of adiponitrile which comprises bringing ammonia and a member of the group consisting of adipic acid, adipamide, adipimide, an ester of adipic acid, omega-cyanovaleric acid, adipamic acid, and omega-cyanovaleramide in admixture with each other at a temperature sufficient to cause the vaporization of said member of said group and creating thereby a gaseous mixture comprising said two components, bringing said gaseous mixture into contact with a dehydration catalyst at a temperature between 320° and 400° C. for a period of time between about one second and about ten seconds, said reaction being further characterized in that the ammonia present in the gaseous mixture to be passed over the catalyst is in an amount which is in excess of the molecular equivalent of the compound selected from the group enumerated above.

WILBUR A LAZIER.